United States Patent

[11] 3,593,215

[72] Inventor Robert A. Moore
Severna Park, Md.
[21] Appl. No. 811,710
[22] Filed Apr. 1, 1969
[45] Patented July 13, 1971
[73] Assignee Westinghouse Electric Corporation
Pittsburgh, Pa.

[54] FIELD SHAPING FOR MAGNETOELASTIC DELAY LINES
9 Claims, 7 Drawing Figs.

[52] U.S. Cl. .......... 333/30, 330/4.6, 330/5, 340/15
[51] Int. Cl. .......... H03h 9/30
[50] Field of Search .......... 333/30; 340/15; 330/4.6, 5.5

[56] References Cited

UNITED STATES PATENTS

| | | | |
|---|---|---|---|
| 3,249,882 | 5/1966 | Stern | 330/4.6 |
| 3,302,136 | 1/1967 | Auld | 333/30 |
| 3,251,026 | 5/1966 | May, Jr. | 340/15 |
| 3,290,610 | 12/1966 | Auld | 330/4.6 |
| 3,444,484 | 5/1969 | Bierig | 333/30 |
| 3,366,896 | 1/1968 | Skudera | 333/30 |

*Primary Examiner*—Herman Karl Saalbach
*Assistant Examiner*—C. Baraff
*Attorneys*—F. H. Henson, E. P. Klipfel and J. L. Wiegreffe

ABSTRACT: Desired magnetic field shaping in a delay line for controlling its dispersive characteristics is achieved by placement of a ferrite material in intimate contact with a high Q magnetic insulating (YIG) material. Low loss is achieved by maintaining the RF coupling circuit in intimate contact with the crystal end and having the dispersive characteristic of the line controlled by ferrite magnetic field shaping material and the RF circuit interpenetrate. Dispersive characteristics of magnetoelastic delay lines are thus controlled through field shaping.

FIELD SHAPING FOR MAGNETOELASTIC DELAY LINES

The present invention makes use of the magnetoelastic delay characteristic as is manifest in such high Q magnetic electrically insulating crystals as yttrium-iron-garnet, commonly called YIG and will be described in connection therewith. However, other crystals which are simultaneously ferromagnetic and exhibit good acoustic propagation properties, such as doped YIG, may also be used. The invention also exhibits utility with other acoustic coupling mechanisms which are magnetic field dependent, but not necessarily ferromagnetic, such as paramagnetic materials. Examples of these are irradiated and doped single crystalline and fused quartz, iron doped rutile, barium titanate and strontium titanate. The invention is also applicable to a delay mechanism which is nonacoustic, but which is magnetic field dependent, such as magnetostatic delay in YIG and other crystals.

Important properties or characteristics of magnetoelastic delay lines are insertion loss, band width, and dispersion. Energy propagation through a YIG delay line is induced by applying a microwave RF field perpendicular to the YIG rod axis with a steady magnetic field applied parallel to the axis. Transduction of RF energy to spin wave energy takes place at a point near the end of the rod, with transduction efficiency being proportional to the RF magnetic field strength at the location of the rod end. Low insertion loss broadband match of the RF coupling circuit to the delay line crystal may be optimized by matching the transducer to the equivalent spin wave plus conversion loss resistance of the delay line. Arrangements for controlling the characteristic impedance of the RF input line or transducer are known. Likewise it has been reported by B. A. Auld et al., in "Internal Magnetic Field Analysis and Synthesis for Prescribed Magnetoelastic Delay Characteristics," *Journal of Applied Physics*, Vol. 37, No. 3, pp. 983—987, March, 1966, that dispersion can be influenced by shaping the magnetic field. The present invention is primarily directed toward a novel arrangement for improving the dispersive characteristics of magnetoelastic delay lines by placement of a ferrite material in intimate contact with the YIG rod at its end such that the ferrite magnetic field shaping material and the RF circuit interpenetrate.

In the drawings:

FIG. 4 is a schematic illustration of a magnetic circuit arrangement for a long pulse spread delay line embodying the principles of the present invention, while

FIG. 6 is a schematic of a magnetic circuit arrangement of a nondispersive delay line embodying the principles of the present invention, while

Figure 1:
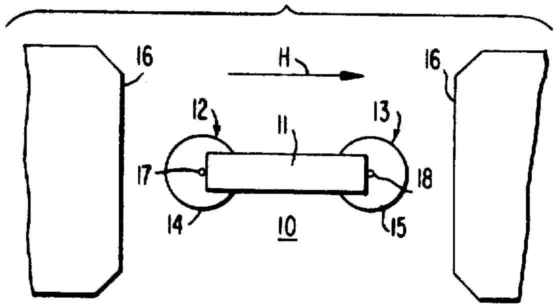
FIG. 1 is a schematic illustration of a typical magnetoelastic delay line.

Referring now to FIG. 1, there is illustrated one form of a known RF coupling arrangement for a broad band acoustic delay line. As illustrated, the delay line 10 includes a YIG rod 11 which may be, for example, rectangular in cross section and supported within a suitable housing. Positioned at spaced locations along the length of the rod are RF input and output coupling circuits 12 and 13, respectively. Each coupling circuit includes, respectively, a coaxial line 14, 15 which is preferably matched to the input impedance of the YIG crystal. A bias magnetic field magnet 16 having its poles disposed along the axis of the YIG rod and spaced from the ends thereof establishes a steady state DC magnetic field H longitudinally of the rod.

The theory of operation of such a delay line is well known and will not be described in detail herein. Briefly, a microwave input signal produced in the YIG rod 11 by the RF coupling circuit 12 of frequency $\omega=\gamma H$ ($\gamma=2.8\times10^6$ Hz./$_{Oersted}$), couples to a magnetic dipole moment existing due to the static biasing magnetic field H oriented at right angles to the RF field to thereby establish a magnetic precessional moment at a position along the rod in the region of the nonuniform field. This corresponds to exciting a long wavelength spin wave. As the spin wave propagates from left to right along the axis of the rod, the field H decreases sharply at the edge of the input coupling circuit 12 and the spin wave becomes an acoustic wave due to magnetoelastic coupling. From the position corresponding to the edge of the strong magnetic field of the input coupling assembly 12, the acoustic wave travels along the rod at the appropriate acoustic velocity to the output coupling circuit 13. The acoustic wave converts by reverse order to a spin wave and the spin wave motion creates an $H_{RF}$ which is picked up by the output coupling circuit and coupled out as an output pulse. This output pulse is delayed relative to the input signal by a factor proportional to the acoustic velocity within the YIG rod.

The coaxial lines of the RF coupling circuits each have their center conductors 17 and 18 (FIG. 2) in close proximity to and preferably in intimate contact with the adjacent end of the YIG rod 11. Thus, the YIG rod is mounted so as to penetrate the RF magnetic field coupling circuits. The outer diameter of each coaxial line is preferably large enough to encircle the active portion of the adjacent end of the YIG rod. Typically, the YIG rod has an active portion of one to two millimeters in a 1 cm. length rod. The inner conductor of the coaxial line is approximately 0.05 to 0.1 times the diameter of the outer conductor and a dielectric with a dielectric constant, $\epsilon_r$ large enough to provide a typically 50 ohm transmission line is used. This has the effect of matching the coupler to its feed.

Figure 2:
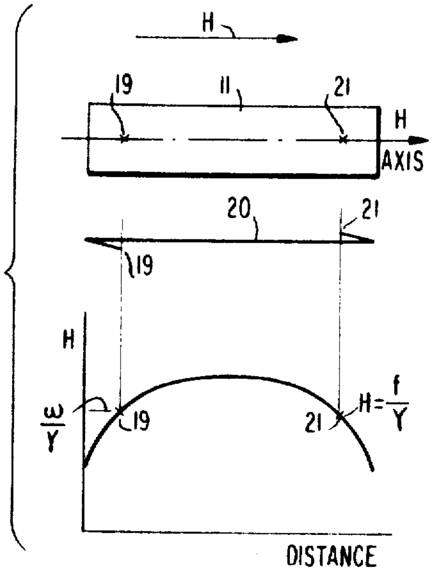
FIG. 2 is a graph of the field distribution in the YIG rod of FIG. 1 along the H axis with the signal path shown schematically free from the transduction point close to the first end to the pick up point close to the opposite end.

FIG. 2 illustrates a typical magnetic distribution curve in the YIG rod along the H axis with a uniform applied magnetic field H. Because of demagnetizing effects, the field inside the YIG rod is a function of the applied external field, the geometry of the sample and the position inside it. Generation will occur at the point inside the rod where the effective internal field has the proper value to bias a magnetic mode to resonance at the operating frequency. This occurs at the level designated $\omega/\gamma$, where omega is the radian precession frequency and gamma is the gyromagnetic ratio, which determines the transduction point at which generation and detection of the propagating magnetic wave occurs.

Figure 3:
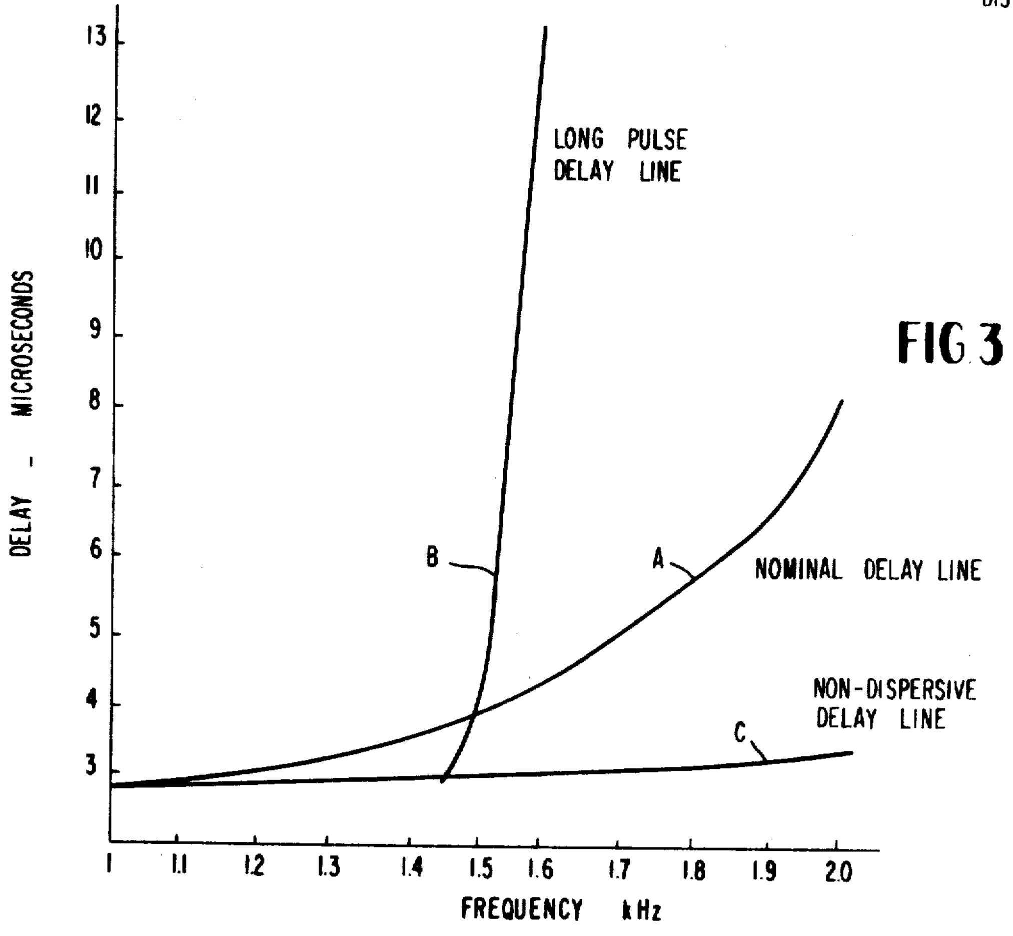
FIG. 3 is a graphical comparison of dispersion characteristics of the YIG rod of FIG. 1 immersed in a uniform magnetic field to those of the YIG rod of FIGS. 4 and 6.

The propagation path presented by a transmission delay line is shown schematically free from and beginning at the transduction point 19. Transduction occurs for the magnetic field for which $f=\gamma H$ where $\gamma=2.8\times10^6$ cycles per Oersted. Thus, for $f=1.4$ GHz., transduction occurs where $H=500$ Oersteds. Propagation goes from right to left, as viewed in FIG. 2, along line 20 to the end of the rod, reflects, goes to the other end (left to right), reflects and is transduced at point 21 where $H=f/Y$. Since delay time is dependent on the propagation path length, it is dependent on magnetic field distribution. In the graph of FIG. 3, line $A$ illustrates the dispersion characteristic achieved through immersing the YIG rod in a uniform field distribution. It can be seen that for a uniform $H$ applied, the pulse spread length maximum is approximately 2 microseconds.

For certain applications, spread pulse lengths up to 10 microseconds are desirable. On the other hand, in certain applications a nondispersive delay line is desirable. Neither of these latter lines can be constructed using a uniform applied field, however, these results can be obtained according to this invention by using field shaping wherein an interpenetrating magnetic field bias circuit and an RF magnetic field circuit provide simultaneous efficient coupling and field shaping. Using an interpenetrating magnetic field coupling circuit-field shaping circuit allows field shaping to fractional millimeter detail. Such detail cannot be achieved by merely field shaping around the coupling circuit which is generally at least 4 millimeters in diameter.

Figure 4:
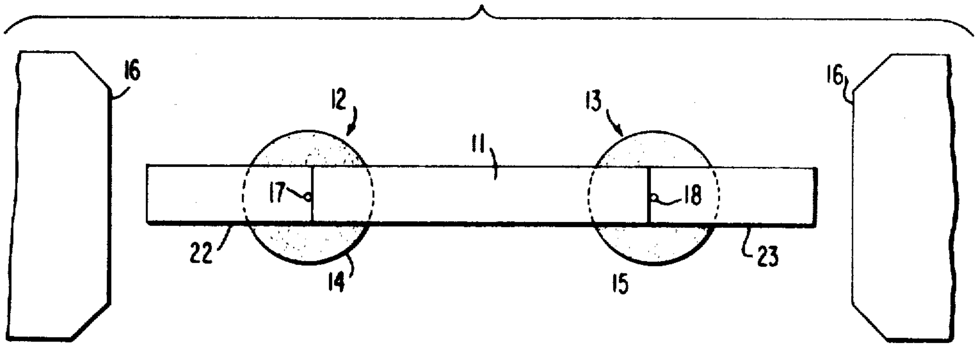

FIG. 4 illustrates a magnetoelastic delay line embodying the present invention which is effective in providing a pulse stretch or delay of up to 10 microseconds. The structure is similar to that of FIG. 1 except that field shaping ferrites 22 and 23 are added as part of the magnetic field circuit or magnetic bias circuit adjacent opposite ends of the YIG rod 11. The ferrite rods may be rectangular in shape and are secured in any convenient manner with their longitudinal axes aligned with the long axis of the YIG rod. The ferrite may be held in place by bonding, epoxying, or clamping by a setscrew or the like.

Each center conductor 17 and 18 passes through the ferrite and is disposed adjacent one end of the YIG crystal. In this manner, the penetrating portion of the magnetic circuit is insulating magnetic (ferrite) material which has a broad resonant line width. A broad line width material, such as a ceramic ferrite, usually displays a line width greater than 20 or 30 Oersteds and up to several hundred Oersteds. The broad line widths tend to avoid resonant absorption of the ferrite since coupling is proportional to reciprocal line widths ($1/\Delta H$).

Figures 5, 7:
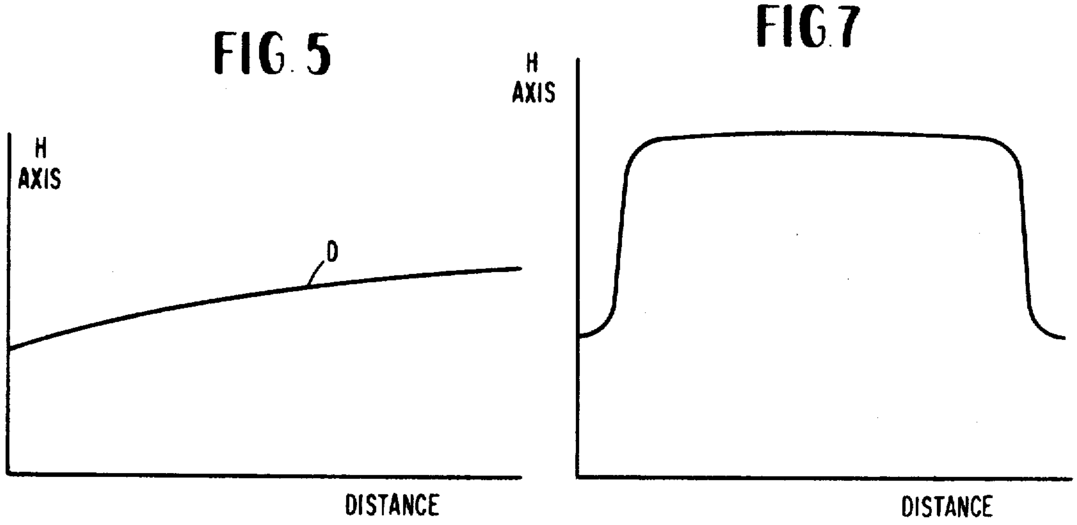
FIG. 5 illustrates graphically the field distribution in the rod.
FIG. 7 illustrates graphically the magnetic field distribution in the rod.

This arrangement places the YIG crystal 11 in a portion of the magnetic circuit for which the field is slowly varying as a function of distance which is necessary for long differential delays. As shown in FIG. 5, the magnetic field along the YIG rod axis is slowly increasing. Comparing the field distribution of the delay line of FIG. 4 having a ferrite (magnetic insulating material) extension on the YIG rod to that of the delay line of FIG. 1 having a uniform applied magnetic field and no magnetic insulating extension, it will be seen that in the latter case the slope of the field distribution is maximum at the ends, while in the former case it is almost constant along the length. This is because the ferrite magnetic field shaping element places the RF coupling circuit away from the ends of the composite YIG rod with ferrite extensions and at a portion of the rod in which the field is slowly varying. The small magnetic field gradient in the portion of the YIG rod near the turning point results in a large dispersion as illustrated by the long pulse delay line B of FIG. 3. A large field gradient near the turning point gives a nearly dispersionless line as shown by line C of FIG. 3.

Figure 6:
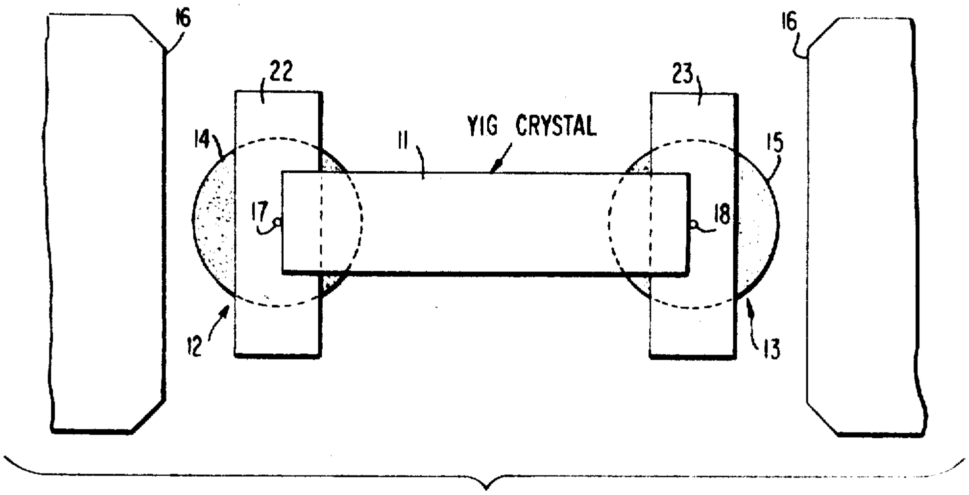

The nondispersive delay line can be achieved by disposing the ferrite pieces transverse to the H axis or long axis of rod 11 as shown in FIG. 6. This provides a very sharply increasing field with distance close to the end as seen in FIG. 7. For a frequency of 1.5 GHz, the field gradient must be 4000 gauss per centimeter. As in the embodiment of FIG. 4, a broad line width ferrite can be used for that portion of the magnetic circuit which penetrates the RF coupling circuit.

What I claim is:

1. A magnetoelastic delay line having a controlled dispersive characteristic comprising, a high Q magnetic, electrically insulating element, ferrite elements disposed adjacent at least two spaced points on said high Q element, means for applying a static magnetic field along an axis of, and through, said high Q element and said ferrite elements and an RF coupling circuit disposed to couple an RF magnetic field into said high Q element and said ferrite elements, whereby said RF and static magnetic fields interpenetrate for providing said controlled dispersive characteristics.

2. A magnetoelastic delay line as set forth in claim 1 wherein said high Q magnetic insulating element is selected from a class of materials including YIG, doped YIG, paramagnetic doped fused quartz, paramagnetic doped single crystalline quartz, iron doped rutile, iron doped barium titanate and strontium titanate.

3. A magnetoelastic delay line as set forth in claim 1 wherein said ferrite element is a rod, said rod having one end in intimate contact with one end of the high Q magnetic insulating element and its axis parallel to said axis of said high Q element.

4. A magnetoelastic delay line as set forth in claim 1 wherein said ferrite element is a rod, said rod being in intimate contact with one end of the high Q magnetic insulating element and being disposed with its axis transverse to said axis of the high Q element.

5. A magnetoelastic delay line comprising, a YIG rod, an RF coupling circuit adjacent opposite ends of the rod, means for applying a magnetic field along the rod and a magnetic field bias circuit disposed to interpenetrate the RF circuit for shaping an applied magnetic field.

6. A magnetoelastic delay line as set forth in claim 5 wherein said magnetic field bias circuit comprises, a ferrite element at each end of the rod, said ferrite elements being in intimate contact with the adjacent end of the YIG rod and the corresponding RF coupling circuit.

7. A magnetoelastic delay line as set forth in claim 5 wherein each ferrite element is a rod disposed along the axis of the YIG rod with one end of the ferrite rod being in intimate contact with one end of the YIG rod.

8. A magnetoelastic delay line as set forth in claim 5 wherein each ferrite element is disposed with its axis transverse to the axis of the YIG rod.

9. A magnetoelastic delay line as set forth in claim 5 wherein said RF coupling circuit adjacent opposite ends of the YIG rod comprises, a coaxial input line having a characteristic impedance substantially matched to that of the YIG rod.